US012050200B2

(12) United States Patent
Clochard

(10) Patent No.: US 12,050,200 B2
(45) Date of Patent: Jul. 30, 2024

(54) METHOD OF MONITORING THE INTERIOR OF A SUBSEA PIPELINE

(71) Applicant: IFP Energies nouvelles, Rueil-Malmaison (FR)

(72) Inventor: Vincent Clochard, Rueil-Malmaison (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 0 days.

(21) Appl. No.: 17/768,410

(22) PCT Filed: Oct. 1, 2020

(86) PCT No.: PCT/EP2020/077597
§ 371 (c)(1),
(2) Date: Apr. 12, 2022

(87) PCT Pub. No.: WO2021/073893
PCT Pub. Date: Apr. 22, 2021

(65) Prior Publication Data
US 2024/0118246 A1    Apr. 11, 2024

(30) Foreign Application Priority Data
Oct. 14, 2019   (FR) ...................................... 1911387

(51) Int. Cl.
*G01N 29/09* (2006.01)
*G01N 29/265* (2006.01)

(52) U.S. Cl.
CPC ........... *G01N 29/09* (2013.01); *G01N 29/265* (2013.01); *G01N 2291/0251* (2013.01); *G01N 2291/103* (2013.01); *G01N 2291/2634* (2013.01)

(58) Field of Classification Search
CPC ................. G01N 29/09; G01N 29/265; G01N 2291/0251; G01N 2291/103; G01N 2291/2634
See application file for complete search history.

(56) References Cited

U.S. PATENT DOCUMENTS

| 4,422,166 A | 12/1983 | Klein |
| 2008/0163700 A1 | 7/2008 | Huang |

(Continued)

FOREIGN PATENT DOCUMENTS

| FR | 3001162 A1 | 7/2014 |
| WO | 2011133046 A1 | 10/2011 |

(Continued)

OTHER PUBLICATIONS

Sebastian Wöckel et al. "Acousto-capacitive tomography of liquid multiphase systems"; Sensors and Actuators A: Physical, vol. 172, No. 1, Jul. 23, 2011, pp. 322-329.

(Continued)

*Primary Examiner* — Suman K Nath
(74) *Attorney, Agent, or Firm* — FITCH, EVEN, TABIN & FLANNERY, LLP

(57) ABSTRACT

The invention relates to a method of monitoring the interior of a pipeline (1) positioned in contact with a soil (S) below a water mass (E), comprising implementation of the following steps by data processing means (11):
  (a) for at least one position along said pipeline (1), obtaining acoustic data descriptive of at least one cross-section of said pipeline (1) at said position, acquired by a mobile acoustic acquisition device (20) in said water mass (E),
  (b) estimating by quantitative migration from said acoustic data an estimated relative impedance perturbation profile in at least said cross-section of said pipeline (1).

15 Claims, 8 Drawing Sheets

(56) References Cited

U.S. PATENT DOCUMENTS

| | | | |
|---|---|---|---|
| 2009/0213689 A1* | 8/2009 | Tello | E21B 47/005 367/35 |
| 2013/0298937 A1 | 11/2013 | O'Donnell | |
| 2018/0058209 A1* | 3/2018 | Song | G01P 5/16 |
| 2018/0100950 A1 | 4/2018 | Yao | |

FOREIGN PATENT DOCUMENTS

| | | |
|---|---|---|
| WO | 2013169984 A1 | 11/2013 |
| WO | 2014114887 A1 | 7/2014 |

OTHER PUBLICATIONS

Alessandro Simi et al. "Hough transform based automatic pipe detection for array GPR: algorithm development and on-site tests" Radar Conference, 2008, May 26, 2008, pp. 1-6.

Li Haifeng et al. "Robotic Subsurface Pipeline Mapping with a Ground-penetrating Radar and a Camera"; International Conference on Intelligent Robots and Systems (IROS), Oct. 1, 2018, pp. 3145-3150.

International Search Report for PCT/EP2020/077597 mailed Nov. 20, 2020.; 6 pages.

Gregory Beylkin "The Inversion Problem and Applications of the Generalized Radon Transform"; Communications on Pure and Applied Mathematics, vol. XXXVII, 1984, pp. 597-599.

Bastien Chapuis et al. "Hydrate plug localization and characterization using guided waves"; 11th European Conference on Non-Destructive Testing (ECNDT 2014), Oct. 6-10, 2014; 7 pages.

Constantin Gerea et al. "Multicomponent True-Amplitude Anisotropic Imaging"; proceedings of the 9th IWSA workshop, SEG; 2000.

Remi André Kippersund et al. "Hydrate deposit detection in pipes using ultrasonic guided waves"; Proceedings of the 34th Scandinavian Symposium on Physical Acoustic, Geilo Jan. 30-Feb. 2, 2011; 20 pages.

Gilles Lambaré et al. "Iterative asymptotic inversion in the acoustic approximation"; Geophysics, vol. 57, No. 9, 1992; pp. 1138-1154.

D. Miller et al. "A new slant on seismic imaging: Migration and integral geometry"; Geophysics, vol. 52, No. 7, Jul. 1987; pp. 943-964.

L. Nicolétis et al. "3-D True-Amplitude Migration of 3-C Compressional and Converted Shear Waves"; Journal of Seismic Exploration 6, 1997; pp. 127-142.

L. Pomie et al. "Hydrate Plug Localization and Characterization with Ultrasonic and Guided Waves Technologies"; In 9th North American Conference on Multiphase Technology. BHR Group; 2014; 29 pages.

Xuesong Wang et al. "Detection of hydrate and other blockages in gas pipelines using acoustic reflectometry"; Journal of Mechanical Engineering Science, vol. 226, Issue 7, 2011; 11 pages.

* cited by examiner

[Fig. 1]

[Fig. 4a]
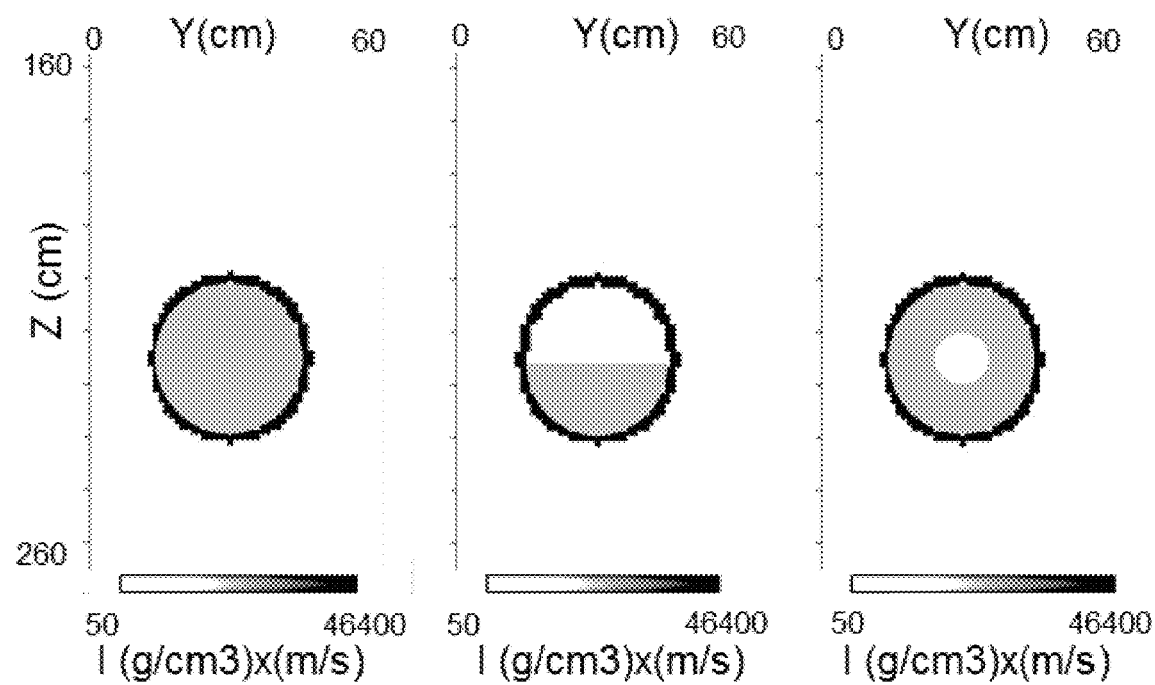
[Fig. 4b]
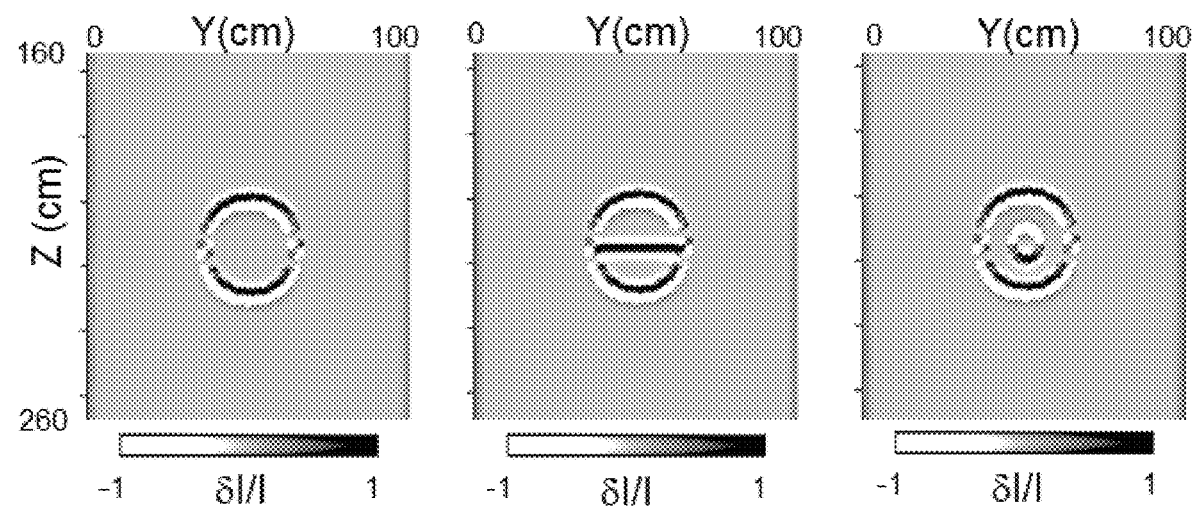

[Fig. 4c]
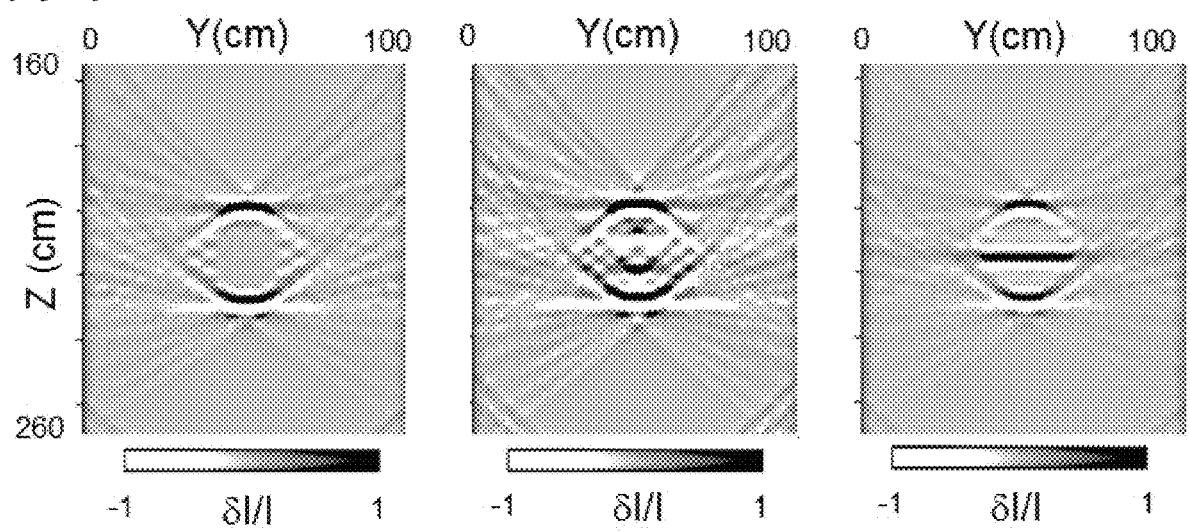

[Fig. 5a]
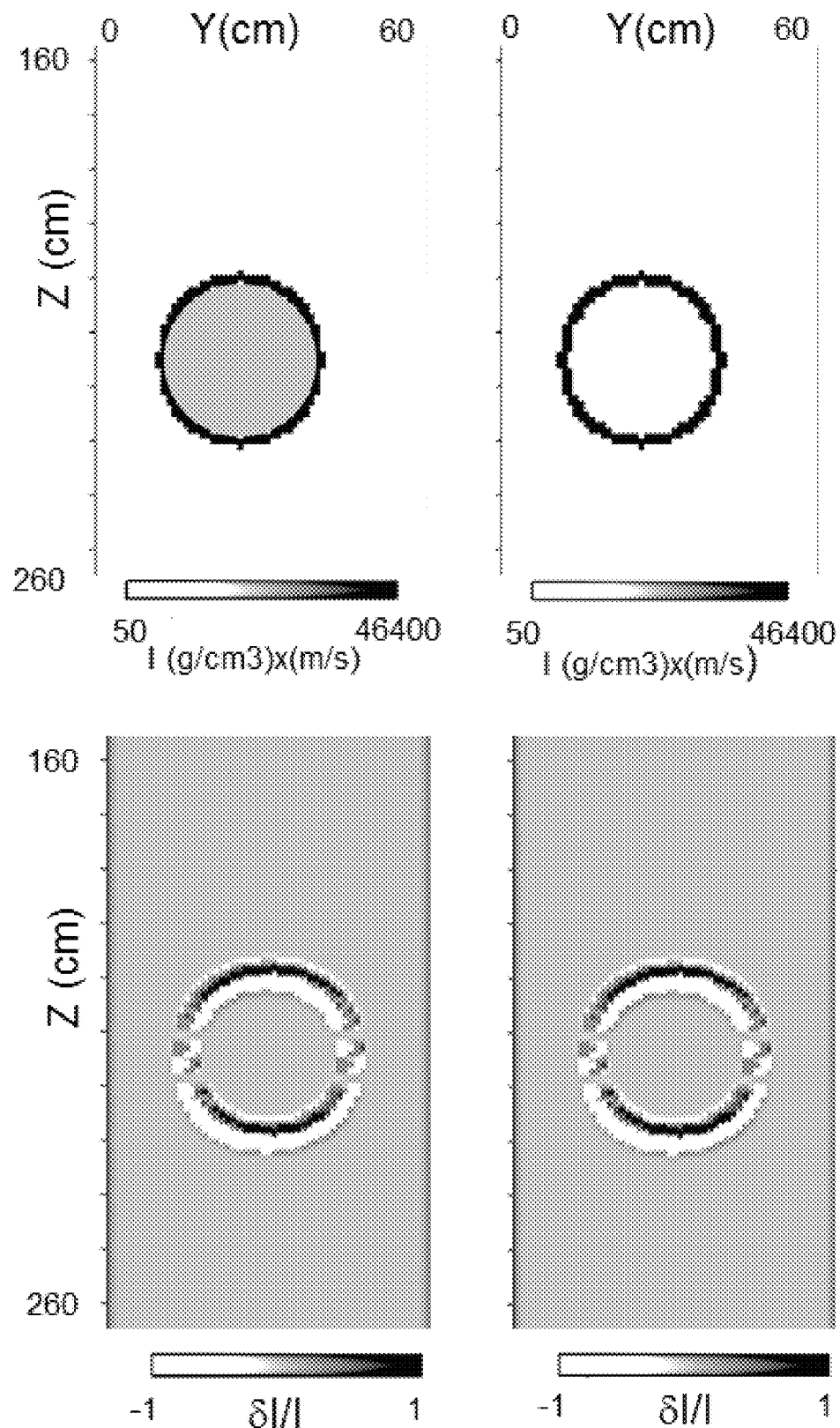

[Fig. 5b]
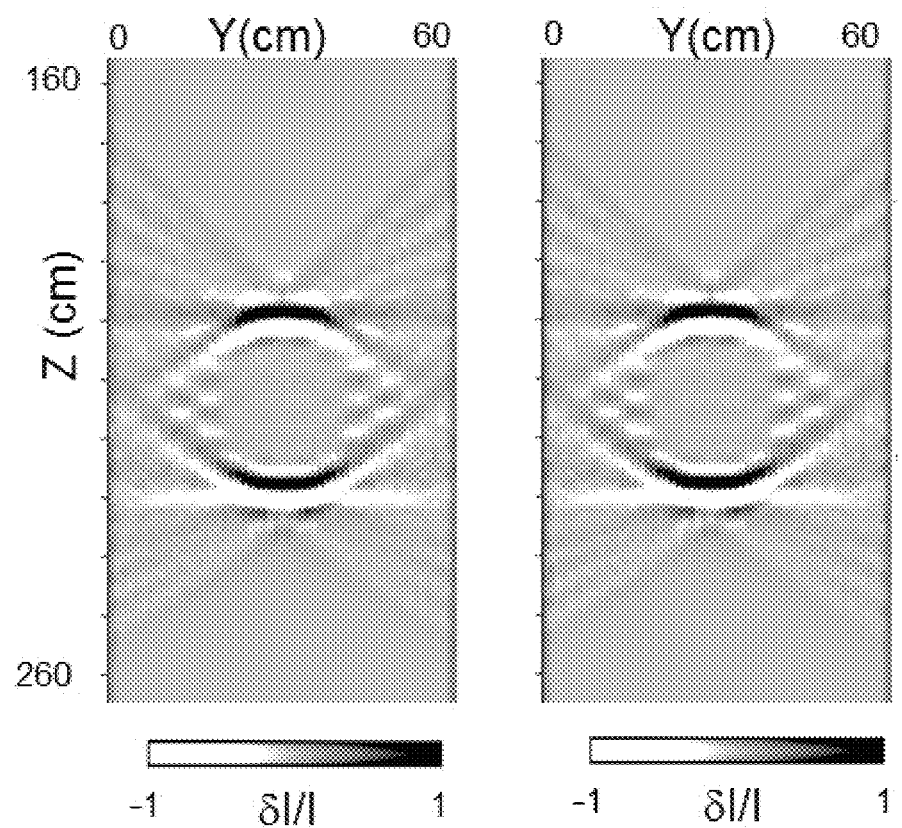

METHOD OF MONITORING THE INTERIOR OF A SUBSEA PIPELINE

CROSS-REFERENCE TO RELATED APPLICATIONS

This application is a U.S. national phase application filed under 35 U.S.C. § 371 of International Application No. PCT/EP2020/077597, filed Oct. 1, 2020, which claims priority from French Application Ser. No. 19/11,387, filed Oct. 14, 2019, the entirety of each of which is incorporated herein by reference.

FIELD OF THE INVENTION

The present invention relates to a method of monitoring the interior of a subsea pipeline. A pipeline is understood to be a pipe intended for transport of fluids such as hydrocarbons.

BACKGROUND OF THE INVENTION

In hydrocarbon transport pipelines, plugs may form for various reasons and block production. They can be removed by local heating, but this first requires locating them with minimum precision (within a few meters, whereas pipelines can be several kilometers in length).

A certain number of techniques are known, but they face some limitations in terms of acquisition constraints.

Indeed, techniques such as acoustic reflectometry (based on the principle that the propagation of an acoustic wave in a fluid medium is very sensitive to each discontinuity in the fluid properties, see Wang et al., 2011) or the use of guided waves (Kippersund et al., 2011; Chapuis et al., 2014; Pomié et al., 2014) require access to the interior of the pipe, which is complex, in particular for deepwater and/or at least partly buried pipelines.

Alternatively, ultrasonic methods as described in patent applications FR-3,001,162, WO-2014/114,887, WO-2013/169,984 and WO-2011/133,046 use devices pressed on the pipeline (transmitters and sensors arranged all around the pipeline). It is no longer necessary to access the pipeline interior, but they remain difficult to implement with pipelines such as buried or even concrete-coated pipes.

The worst case is that of deepwater buried subsea pipelines, which require delicate and very expensive excavations.

Furthermore, acquisition times for these known methods are very long, up to about ten minutes to have sufficient resolution in a transverse section, which is not an option for investigating dozens or even hundreds of kilometers of pipelines.

It would be advisable to have a new universal solution for detecting plugs in subsea pipelines, including buried pipelines, that would be effective, reliable and inexpensive in relation to the aforementioned existing methods.

The invention aims to improve this situation.

The following documents are mentioned in the description hereafter:

Beylkin, G., 1984, The inversion problem and applications of the generalized Radon transform: Comm. Pure Appl. Math., 37, 579-599.

Chapuis, B., Baronian, V., Jenson, F. and Pomié, L., 2014, Hydrate plug localization and characterization using guided waves. 11th European Conference on Non-Destructive Testing (ECNDT 2014), Oct. 6-10, 2014, Prague, Czech Republic.

Gerea, C., Nicoletis, L., and Granger, P. Y., 2000, "Multi-component true amplitude anisotropic imaging", proceedings of the 9th IWSA workshop, SEG.

Kippersund, R. A., Lunde, P., and Frøysa, K. E., 2011. Hydrate Deposit Detection in Pipes Using Ultrasonic Guided Waves. In Proceedings of the 34th Scandinavian Symposium on Physical Acoustics.

Lambaré, G., Virieux, J., Madariaga, R., Side, J., 1992, Iterative asymptotic inversion in the acoustic approximation. Geophysics, 57, 1138-1154.

Miller, D., Oristaglio, M., and Beylkin, G., 1987, A new slant on seismic imaging: Migration and integral geometry: Geophysics, 52, 943-964.

Nicoletis, L., Svay-Lucas, J., Clochard, V., and Compte, P., 1997, 3D true amplitude migration of 3-C compressional and converted shear wave: J. of Seismic Explo., 6, 127-142.

Pomié, L., Tzotzi, C., Faderne, C., Chapuis, B., and Jenson, F., 2014. Hydrate Plug Localization and Characterization With Ultrasonic and Guided Waves Technologies. In 9th North American Conference on Multiphase Technology. BHR Group.

Wang, X., Lewis, K. M., Papadopoulou, K. A., Lennox, B., and Turner, J. T., 2011, Detection of hydrate and other blockages in gas pipelines using acoustic reflectometry. Journal of Mechanical Engineering Science. 226(7) 1800-1810. DOI: 10.1177/0954406211431029.

SUMMARY OF THE INVENTION

According to a first aspect, the invention provides a method of monitoring the interior of a pipeline positioned in contact with a soil below a water mass, comprising implementation of the following steps by data processing means:
(a) for at least one position along said pipeline, obtaining acoustic data descriptive of at least one cross-section of said pipeline at said position, acquired by a mobile acoustic acquisition device in said water mass,
(b) estimating by quantitative migration from said acoustic data an estimated relative impedance perturbation profile in at least said cross-section of said pipeline.

According to other advantageous and non-limitative features:

Said acoustic acquisition device comprises at least one acoustic wave source and at least one acoustic wave sensor, said acoustic data descriptive of a cross-section of said pipeline at said position being a reflected acoustic field received by the at least one sensor after generation of an acoustic field by the at least one source.

Said acoustic acquisition device comprises a plurality of sensors and/or sources positioned in a substantially orthogonal direction to a longitudinal direction of said pipeline at said position.

Step (b) comprises calculating, at the positions of each source and each sensor, so-called Green's functions representative of a response to a specific acoustic emission at any point of said cross-section, then estimating at any point of said cross-section of said pipeline a relative impedance perturbation value according to said acoustic field received and to parameters of said calculated Green's functions.

Calculation at the positions of each source and each sensor of said Green's functions comprises interpolation according to the real positions of said sources and said sensors of Green's functions pre-calculated for a set of fictitious positions.

Said estimation by quantitative migration is obtained at a point $x_0$ of the cross-section of the pipeline, for a collection of source(s) and sensor(s), if they are coplanar, with the formula:

$$I(x_0) = \frac{4}{(2\pi)^2} \int_{E\Psi_s} d\Psi_s \int_{|p|=0}^{p_{max}} |p| d|p| \hat{f}(p, \Psi_s) e^{-ix_0 \cdot p}$$

and otherwise, with the formula:

$$I(x_0) = \frac{4}{(2\pi)^3} \int_{E\Phi_s} d\Phi_s \int_{E\Psi_s} \sin\Psi_s d\Psi_s \int_{|p|=0}^{p_{max}} |p|^2 d|p| \hat{f}(p, \Psi_s, \Phi_s) e^{-ix_0 \cdot p}$$

with $\Psi_s$ and $\Phi_s$ the angular coverage of the seismic acquisition device, p the diffraction wave number and $\hat{f}$ the Fourier transform of the perturbations of the medium.

The method further comprises a step (c) of comparing said estimated relative impedance perturbation profile with at least one relative impedance perturbation reference model representative of the presence of a plug in the pipeline at said position.

In step (c), said estimated relative impedance perturbation profile is compared with a plurality of relative impedance perturbation reference models representative of a set of possible plug configurations in the pipeline at said position.

Said set of possible plug configurations in the pipeline at said position comprises at least a total plug configuration, a partial plug configuration at the bottom and a partial crown-shaped plug configuration.

In step (c), said estimated relative impedance perturbation profile is further compared with a relative impedance perturbation reference model representative of an absence of plug in the pipeline at said position.

The method further comprises a step (d) of removal of the detected plug.

Said pipeline is a hydrocarbon pipeline, said plug being a hydrate plug.

According to a second aspect, the invention provides an equipment for monitoring the interior of a pipeline positioned in contact with a soil below a water mass, the equipment comprising data processing means configured:
  for at least one position along said pipeline, to obtain acoustic data descriptive of at least one cross-section of said pipeline at said position, acquired by a mobile acoustic acquisition device in said water mass,
  to estimate by quantitative migration from said acoustic data an estimated relative impedance perturbation profile in at least said cross-section of said pipeline.

According to a third aspect, the invention provides a computer program product downloadable from a communication network and/or recorded on a computer readable medium and/or processor executable, comprising program code instructions for implementing the method according to the first aspect, when said program is executed on a computer.

BRIEF DESCRIPTION OF THE FIGURES

Other features, goals and advantages of the invention will be clear from reading the description hereafter, given by way of non-limitative example, with reference to the accompanying figures wherein:

FIG. 4a shows three examples of synthetic plug models (acoustic impedance) for three plug configurations, FIG. 4b shows three examples of relative impedance perturbation models corresponding to the three examples of synthetic plug models of FIG. 4a, FIG. 4c shows three examples of relative impedance perturbation profiles estimated by implementing the quantitative migration according to the invention corresponding to the three examples of relative impedance perturbation models of FIG. 4b, FIG. 5a shows two examples of synthetic plug models and of corresponding relative impedance perturbation models, respectively for a total plug presence configuration and for a plug absence configuration, and FIG. 5b shows two examples of relative impedance perturbation profiles estimated by implementing the quantitative migration according to the invention, corresponding to the two examples of relative impedance perturbation models of FIG. 5a.

DETAILED DESCRIPTION OF THE INVENTION

Principle of the Invention

The present method aims to use acoustic data, for example of CHIRP (Compressed High Intensity Radar Pulse) sonar type, which can be recorded by an acquisition system on board a boat (shallow waters) or by a Remotely Operated underwater Vehicle (ROV) that can travel kilometers a few dozen centimeters (50 cm minimum) or a few meters above a pipeline lying on or (half) buried in the seabed.

More precisely, it is well known to use sonar systems as "sub-bottom profilers" due to their capacity to record the acoustic energy reflected by the marine sediment layers, in the first few meters beneath the sea floor. For example, the Sub-Bottom Imager™ (SBI) of the Pangeo Subsea company can provide a real-time map a few meters wide with a marine sediment penetrability of a few meters or even a few dozen meters. The processing technique implemented uses a beam-forming type technique that focuses the acoustic waves received by the sonar and thus allows to calculate an image in the first meters, down to about twenty meters, beneath the sea floor (according to the frequency content of the acoustic sources).

These known techniques are only directed towards sub-surface exploration (they allow at best, when coupled with a magnetometer, to locate a pipeline, see patent U.S. Pat. No. 4,422,166), but they cannot characterize the interior of a pipeline or, a fortiori, detect a plug in a pipeline.

In a particularly astute manner, the applicant has shown, as described hereafter, that using a suitable quantitative migration technique from acoustic data allows to obtain relative impedance perturbations (it is reminded that the impedance of a medium for an acoustic wave corresponds to the product of the medium density by the acoustic wave propagation speed) by means of which the interior of a pipeline can be monitored and a plug can notably be detected. These perturbations are indeed related to both the make-up of the pipeline and the presence of partial or total plugs, hence the possibility of characterizing the interior of the pipeline with a cross-section.

Thus, it is sufficient to acquire suitable acoustic data by means of a device "travelling above" the pipeline ((over the entire length thereof if one intends to be comprehensive) to detect a plug. This technique thus is totally non-invasive (no access to the pipeline, in one way or another, is required), reliable and less expensive.

Architecture

Figure 1:
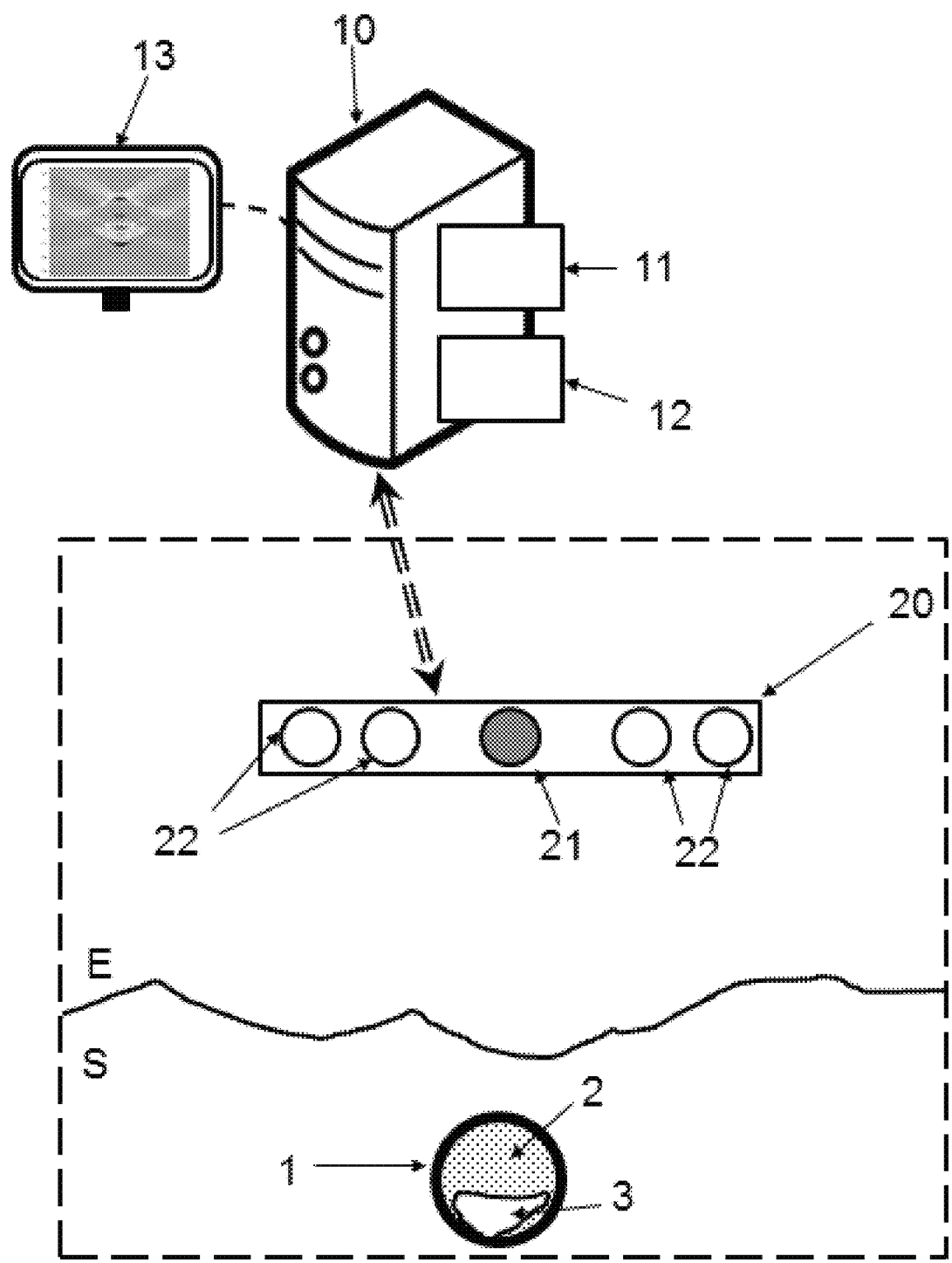
FIG. 1 shows a system architecture for implementing the method according to the invention, FIG. 2 schematically shows the method of detecting a plug in a pipeline according to a preferred embodiment of the invention, FIGS. 3A and 3B the link between angles, i.e. the dips investigated in the medium (angular cover) according to a 2D and 3D acoustic acquisition device.

FIG. 1 depicts a proposed method of monitoring the interior of a pipeline 1 positioned in contact with a soil S below a water mass E. What is meant by "positioned in contact with a soil" is that at least part of pipeline 1 can lie on soil S and/or it can be at least partly buried in soil S.

The present method is typically implemented by means of an equipment 10 as shown in FIG. 1 (a computer workstation for example) equipped with data processing means 11 (a processor) and data storage means 12 (a memory, in particular a hard drive), typically provided with an input/output interface 13 for data input and method results output.

Said pipeline 1 is typically a substantially circular pipe and it forms a wall (that may consist of metal and is possibly coated with one or more types of insulant, up to about fifteen centimeters in total thickness) separating an "interior" from an "exterior". The interior is normally empty (the pipeline is hollow) and is in most cases intended for transporting hydrocarbons in a mixed gas or liquid or solid form, natural gas for example. This empty space that pipeline 1 normally exhibits inside is referred to as a "lumen" 2. As explained, a plug 3 may have formed inside pipeline 1.

A plug 3 is understood to be a solid or at least a substantially more viscous mass than the fluid normally flowing through pipeline 1, thus reducing (partial plug) or obstructing (total plug) lumen 2, and therefore limiting the fluid flow rate in pipeline 1. In the rest of the present description, we take two examples of partial plugs 3, either in a "bottom" configuration (i.e. with the remaining lumen 2 in the upper part), or a "ring-shaped" configuration (i.e. with the remaining lumen 2 in the centre), but it is clear that a plug according to the invention may have any shape. In the case of hydrocarbons, plug 3 that may form is generally a hydrate plug, and this example (gas hydrate) is also used in the rest of the description.

Pipeline 1 is positioned in contact with a soil S below a water mass E, which means that it is a subsea pipeline (water mass E is generally several hundred or even several thousand meters thick), lying on or at least partly buried in the soil. More precisely, what is referred to as the "sea floor" is the interface between solid soil S (generally consisting of sediments) and the water mass E covering it. Pipeline 1 then either rests on the sea floor (it is therefore surrounded with water), or the pipeline is partly buried (its upper part is in contact with the water and its lower part is surrounded with the material of soil S), or it is totally buried (it is then below the sea floor and no longer in contact with the water).

"Monitoring" the interior of pipeline 1 broadly means obtaining any information descriptive of the interior of pipeline 1, in particular any characteristic of the presence or not of a plug 3. More precisely, the result of said monitoring can be characterization of the interior of pipeline 1 (value of different physical quantities), an image of the interior of pipeline 1, or directly information on the presence or not of a plug 3 in pipeline 1 (a Boolean, a classification of a possible plug 3, etc.). In other words, the present method can be a method of characterizing the interior of pipeline 1, a method of imaging the interior of pipeline 1 and/or a method of detecting a plug 3 in pipeline 1.

What is meant in the latter case, which is described more precisely in the rest of the present description, is an attempt to detect at least one plug. In particular, the present method can be implemented in response to the detection of a problem (drop in flow rate), but also preventively, or upon restarting operation of the pipeline, which means that the conclusion at the end of the method implementation may be that there is no plug. Besides, as described below, the present method can be implemented selectively at a targeted section of pipeline 1, or over a greater length, or even over the entire pipeline 1. Since the position of a pipeline 1 is indeed generally geotagged, pipeline 1 can be inspected quite precisely over the entire length thereof.

Figure 2:
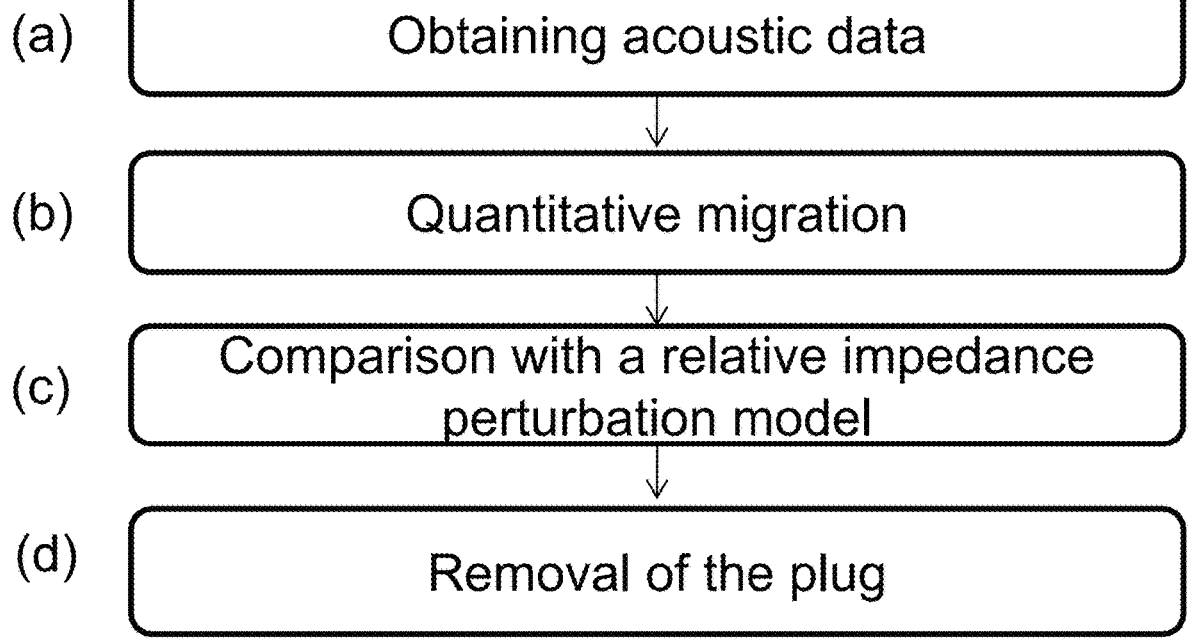

We shall now explain how the present method is implemented for a position along pipeline 1. It will suffice to repeat it for a large number of positions if it is desired to perform extended monitoring. FIG. 2 describes an example of implementation of the method according to the invention.

Obtaining Acoustic Data

As explained above, the method uses data referred to as acoustic, or improperly, as "seismic" data.

In connection with FIG. 2, in a step (a), as is known in marine seismic, data processing means 11 obtain, for a position along said pipeline 1, acoustic data descriptive of a cross-section of said pipeline 1 at said position, acquired from a mobile acoustic acquisition device 20 in said water mass E.

What is referred to as a "mobile acoustic acquisition device in the water mass" is an acoustic acquisition device capable of moving from one position along the pipeline to another.

Said mobile acoustic acquisition device 20 typically is, as explained, a "sediment sounder" such as a boat or a ROV. It comprises at least one source 21 (for example, in conventional marine seismic, a water gun, i.e. a gas mixture explosion chamber) and at least one sensor 22 (also referred to as "receiver", typically a transducer), which means that it emits and records reflected acoustic waves. Preferably, acquisition device 20 comprises a plurality of sources 21 and/or a plurality of sensors 22 (it is then referred to as a sensor array) arranged in a substantially orthogonal direction to a longitudinal direction of said pipeline 1. It will be understood that this direction is obtained through proper positioning of the entire device 20 in water E.

Most often, a single source 21 is arranged amid a sensor array 22 extending on either side (this example is referred to in the rest of the description). This array can be several meters or even several dozen meters in span if several ROVs are arranged side by side for example. Alternatively, there may be a plurality of sources 21 and a single sensor 22, or a plurality of sources 21 and of sensors 22, optionally arranged in a complex manner (not aligned, which requires 3D reconstruction, see below). Sources 21 may for example be provided every meter so as to have information redundancy to improve the signal-to-noise ratio. In any case, acquisition device 20 "travels above" (i.e. moves above the pipeline, through the water mass) the pipeline trajectory, just a few meters above (in particular between 0.5 m and 10 m).

In the present case, it is understood that acquisition device 20 emits and records acoustic waves in a frequency range that is compatible with the diameter of pipeline 1 to be studied, in particular in the range between 600 Hz and 20 kHz. For example, for a 30-cm diameter of pipeline 1, a frequency band between 3 kHz and 15 kHz is required. The person skilled in the art will be able to choose the suitable frequencies. It is clear that such frequency ranges are very different from those used in conventional marine seismic (generally below 200 Hz), which is often intended for imaging objects located several kilometers below the sea floor.

The acoustic waves generated by a source 21 are converted to elastic waves on the sea bottom. The disturbance created is propagated in soil S by progressive waves. When these waves reach a discontinuity surface between two media with different elastic properties or densities, part of the energy returns to the surface due to complex reflection, refraction or wave conversion phenomena. The ascending wave field is recorded by sensors 22 as a function of time from the emission by source 21. A temporal record referred to as "seismic trace" corresponds to each (source 21, sensor 22) pair, all of the records thus obtained being known as a seismogram. The shape of a reflection recorded on the seismogram (more commonly referred to as event) is closely related to the geological discontinuity surface that has generated it, and to the wave type recorded.

The seismogram (real data) thus contains the direct arrival from source 21 to sensor 22 (without reflection), the reflection of the acoustic waves on the sea floor and the wave field diffracted by pipeline 1, or "acoustic field", and possibly by other heterogeneities of the medium. A seismogram is generated for each position of acquisition device 20 moving along the trajectory of pipeline 1 if an extended detection is wanted.

Relevant information for monitoring the interior of the pipeline and more particularly for detecting plugs 3 thus concerns the reflections/diffractions of pipeline 1 recorded in the seismogram, i.e. the acoustic field. The first reflection on the sea floor can be modelled from acquisition device 20, the velocity model and the profile of the sea bottom. When pipeline 1 is buried, the useful information thus arrives just after and can therefore be isolated for imaging. This process can be improved in terms of precision if the position and the diameter of the pipeline are precisely known, because the diffractions on the top and the base of the pipe can thus be directly modelled, and the useful diffractions relative to a possible plug 3 are then located between them. This process can also benefit from already known seismic processing techniques that are commonly used in conventional marine seismic, such as deconvolution by the source signal.

It can be noted that, in some sea bottom configurations (mud flow, collapse), pipeline 1 can move laterally/vertically, and after automatic identification of the diffraction hyperbolas on the pipe, these movements can then be estimated to recalculate the position of the pipeline.

Quantitative Migration

In oil exploration, the main objective of imaging is to move from a time volume (seismogram) to a depth volume that would be equivalent to a vertical geologic section. This is referred to as migration. This problem is all the more difficult as geological media are complex. Migration, for the acoustic case, is formulated as a pseudo-inverse operator of the modelling operator.

Beylkin has established, in the acoustic case, a preserved-amplitude migration theory (Beylkin, 1984) that reconstructs the physical parameter perturbations (compressibility). The geophysical application of this theory is highlighted in (Miller et al., 1987). Beylkin's theoretical work has then been generalized to the elastic case. With this fundamental contribution, the authors exploit the data redundancy to decorrelate the three physical parameters of the elastic problem (P impedance, S impedance and density). These theoretical formulations are therefore suitable for acquisition devices known as "multiple-coverage surface seismic" acquisition devices because they are made up of many sources and sensors evenly distributed over a large surface and providing seismic records with redundant information. Seismic waves propagating in different manners will reflect at a single underground seismic reflector, in other words the rays that are perpendicular to the wavefronts reach the seismic reflector with different angles of incidence.

Thus, the present method comprises a step (b) of estimating by quantitative migration from said acoustic data an estimated relative impedance perturbation profile in said cross-section of said pipeline 1. Said profile generally takes the form of a 2D image of the cross-section (i.e. step (b) provides the estimation for each point of the section—or rather of a predefined domain around pipeline 1—of a relative impedance perturbation value; this can also be referred to as 2D reconstruction).

Quantitative GRT (Generalized Radon Transform) migration is understood to be a migration precisely based on the inverse generalized Radon transform.

For an event recorded at the time t for a (source 21, sensor 22) pair, the principle consists in distributing the amplitude of this event in an isochrone characterized by: $t=ts+tr$, where ts represents the time that it takes for the wave to travel from the source to a point to be imaged $x_0$ and tr is the time that it takes for the wave to travel from this point to the sensor. The isochrones are constructed in the depth domain and the migrated image, obtained by stacking all the isochrones, will be a depth image (i.e. in said cross-section). The reconstructed reflectors then consist of the envelope of the isochrones. Locally, the isochrone curve can be equated to a line segment. When the entire device 20 is taken into account, we have an analogy between the subsurface reconstruction through the weighted stacking of isochrone curves (quantitative migration) and the inverse Radon transform at one point $x_0$ of the subsurface. This stacking principle is valid whatever the position of sources 21 and sensors 22. It can therefore be generalized to any acquisition device 20 architecture.

Quantitative GRT migration is based on the use of functions known as Green's functions (response of the medium to a specific emission, i.e. a Dirac delta distribution). It is then possible to calculate them in isotropic heterogeneous models, at reasonable costs even in 3D. Green's functions intended for quantitative migration are understood to be a set of quantities determined for each point $x_0$ of the subsurface and each source/each sensor, comprising:

the travel time of an acoustic wave from point $x_0$ to the source/the sensor,
a geometric divergence value that corresponds to an amplitude correction as a function of the distance travelled by the acoustic wave between the source/the sensor and the point to be imaged $x_0$,
the polarization angle of the acoustic wave that has travelled the path from the source/the sensor to the point to be imaged $x_0$.

The Green's functions are generally given in form of travel time maps (or cubes), spherical divergence maps (or cubes) and polarization angle maps (or cubes). The Green's functions can be calculated by 2D or 3D ray tracing (see for example [Lambaré et al., 1992]) depending on the propagation medium, and advantageously in an analytical manner when the medium is tabular (see for example [Gerea et al., 2000]). These quantities are used as weights in quantitative migration. Reconstruction and quantification of the physical parameters of the medium is obtained by stacking weighted diffraction curves. Weighting has been defined from the inverse generalized Radon transform, depending on the point to be imaged. One of the key points of quantitative migration is the calculation of the Jacobian, known as the Beylkin Jacobian, which consists in converting the stacks on the source (or sensor, depending on the device type) positions to stacks on the reconstructed dips of the medium. Quantitative GRT migration thus aims to restore the position of the reflectors, as well as their amplitude. It is therefore more precise than a non-quantitative conventional migration. Notably, it makes it possible to compare the relative impedance perturbations obtained by quantitative migration with reference relative impedance perturbations so as to reliably deduce therefrom the presence or not of a plug, its geometry or even its nature.

In the present case, if one considers an acquisition device for monitoring pipelines 1 buried in deepwater, which may for example be arranged on-board a ROV, one may face the problem of a potentially limited coverage of acquisition device 20 and of the lack of information redundancy of the acoustic data, especially if the device passes only once above pipeline 1. In Nicoletis et al. (1997), the authors have developed a mono-parameter representation of the subsurface: zero density perturbation and Poisson's ratio, or relative impedance perturbations P equal to those of the S waves and zero relative density perturbations.

As is shown below, the expression of the 2D imaging formula for estimation of the relative impedance perturbations (case of a collection, i.e. a set of coplanar arranged sources 21 and sensors 22) at a point $x_0$ of the cross-section according to a preferred implementation of the invention can be:

$$I(x_0) = \frac{4}{(2\pi)^2} \int_{E\Psi_s} d\Psi_s \int_{|p|=0}^{p_{max}} |p|d|p|\hat{f}(p, \Psi_s)e^{-ix_0 \cdot p}$$

Vector p is also referred to as diffraction wave number, angle $\Psi_s$ represents the angular coverage of seismic acquisition device 20, $\hat{f}(p, \Psi_s)$ the Fourier transform of the perturbations in the medium. The expression $I(x_0)$ obtained is close to the 2D inverse Fourier transform in polar coordinates.

Similarly, the expression of the 3D imaging formula (case of sources 21 and sensors 22 arranged in any manner) at point $x_0$ according to a preferred implementation of the invention can be:

$$I(x_0) = \frac{4}{(2\pi)^3} \int_{E\Phi_s} d\Phi_s \int_{E\Psi_s} \sin\Psi_s d\Psi_s \int_{|p|=0}^{p_{max}} |p|^2 d|p|\hat{f}(p, \Psi_s, \Phi_s)e^{-ix_0 \cdot p}$$

The two Euler angles $\Psi_s$ and $\Phi_s$ represent the angular coverage of seismic acquisition device 20 (this time with two coordinates due to the non-coplanar arrangement). The expression $I(x_0)$ obtained is close to the 3D inverse Fourier transform in spherical coordinates.

In practice, a quantified image of the subsurface is obtained for each collection with a common source 21/sensor 22. The quantified image of the subsurface for the complete device 20 is obtained by simple stacking of the images obtained for the various collections.

Green's Functions

As explained above, once the wave field diffracted by pipeline 1 (i.e. the acoustic field) is isolated/identified, quantitative imaging can be applied. It is based on the calculation of the Green's functions at each position (source, sensor). In other words, step (b) comprises in particular calculating, at the positions of each source 21 and each sensor 22, so-called Green's functions representative of a response of the medium to a point acoustic emission, then estimating at any point of said cross-section of said pipeline 1 a relative impedance perturbation value according to said acoustic field received and parameters of said calculated Green's functions.

Knowing the velocity model, the Green's functions can be very advantageously pre-calculated for some source and sensor positions, and possibly re-interpolated in order to save calculation time, especially with 3D imaging.

In this regard, calculation of the Green's functions at the positions of each source 21 and each sensor 22 can comprise interpolation according to the real positions of sources 21 and sensors 22 of Green's functions pre-calculated for a set of fictitious positions.

The idea is to define a fictitious acquisition device whose sources and sensors would be distributed in a known manner, in particular evenly distributed, so as to readily express the real positions in relation to these fictitious positions. For example, said fictitious positions can be selected at the vertices of a regular geometric structure, a square grid pattern for example. It can be noted that one is not limited to a regular arrangement and that any fictitious position can be selected (for example by distributing them statistically in relation to a set of known devices 20), these fictitious positions just need to be sufficient in number and sufficiently distributed for the real positions to be expressed as a function of the fictitious positions.

Each real position of source 21/sensor 22 can thus be associated with a group of fictitious positions of source 21/sensor 22 (typically the group of neighbouring vertices). Pre-calculation of the Green's functions consists in calculating them at each fictitious source and sensor position, when appropriate early enough in the process and in particular before the quantitative migration calculation of step (b), which allows to save calculation time and may be decisive for real-time processing.

Interpolation consists in defining an interpolation coefficient that is associated with each fictitious position in a group. For example, if there are 4 fictitious positions at the vertex of a square, the weight will be ¼ for each. More precisely, since a Green's function is characterized by parameter maps/cubes (travel time, geometric divergence, polarization angles), interpolation of the Green's functions thus consists in interpolating these maps/cubes. Since the velocity model is smooth enough, linear interpolation can be considered.

It can be noted that, if one does not want an interpolation (2D for example), a real position just needs to be associated with a fictitious position and an interpolation coefficient equal to 1.

Quantitative Migration Calculation

The velocity model of the acoustic waves in water mass (E) (whether salt water or not) and in the first few meters of soil S (often having the characteristics of mud and/or unconsolidated sediments) in the zone of interest surrounding pipeline 1 to be monitored is assumed to be known.

Quantitative migration can be likened to the weighted stacking of isochrones that are associated with each amplitude of a seismic trace and therefore with a (source 21, sensor 22) pair. For example, if the velocity model is homogeneous, an isochrone is a portion of an ellipse whose foci correspond to the position of source 21 and sensor 22.

The general formulation of the imaging problem proposed by Beylkin is given by the following relation:

$$I(x_0) = \sum\nolimits_{\sigma(s),\sigma(r)} \sum\nolimits_{\omega=-\omega_{max}}^{+\omega_{max}} (B_b)*(s,x_0,r,\omega)Q(s,x_0,r,\omega)\delta U_b^{obs}(s,r,\omega)$$

As explained above, $x_0$ is a point of the domain (i.e. a point in the medium) to be imaged and quantity $I(x_0)$ represents the result of the quantified image of the subsurface at point $x_0$, in the present case the relative impedance perturbation value at this point, the whole making up said profile.

Stacking on frequencies is limited by the upper boundary of the frequency spectrum of the observed data ($\omega_{max}$).

Spatial stacking on the parametric variables $\sigma(s)$ and/or $\sigma(r)$ depends on the seismic acquisition devices and on the dimension of the seismic acquisition (line, curve, surface).

$(B_b)^*$ is the adjoint of the ray-Born modelling operator (direct modelling problem).

$\delta U_b^{obs} = U_b^{obs} - U^{ref}$ is the linearized diffracted field recorded at sensor r in direction b. In the first order, it represents the ascending waves observed.

Q is a weight to be defined, function of the point $x_0$ considered, for the reconstructed quantified image to be as close as possible to the perturbations of the medium (which is what is sought here).

We describe hereafter a way of determining the imaging formula of a preferred implementation of the invention already described above.

In general, the weighting that enables quantitative reconstruction of the physical parameters of the subsurface is defined from Beylkin's Jacobian [Beylkin, 1984], which allows to convert discrete stacking on source 21 (and/or sensor 22, depending on acquisition devices 20) positions to integration on the reconstructed dips of the medium. This Jacobian is expressed as a function of parameters of Green's functions that can be calculated by 2D or 3D ray traces.

Weighting calculation involves several hypotheses: local approximation, space dimension (2D, 3D), spatial sampling of sources 21 and sensors 22, the type of waves converted or not. In practice, acquisition devices 20 have limited coverage, the quantified image of the subsurface can then be seen as a filter of the elastic parameters of the subsurface.

Furthermore, it is not always possible to decorrelate the three parameters characterizing an isotropic elastic medium (P impedance denoted by Ip, S impedance denoted by Is and density denoted by ρ). This is particularly true for devices intended for plug detection in pipelines. In other words, the angular coverage of one point is low and a single parameter can be estimated. It is reminded that a distinction is made between P waves, i.e. the pressure waves or primary waves, and S waves, i.e. the shear waves or secondary waves.

Density is disregarded hereafter as its influence is negligible up to a 40° incidence in the chosen parametrization (impedance and density). The so-called mono-parameter hypothesis of the P waves can then be made. It is based on the correlation of the P and S reflectivities of the subsurface. This hypothesis thus results, for P waves, in a zero relative density perturbation and in equal P and S relative impedance perturbations ($\delta I_P/I_P = \delta I_S/I_S$, $\delta\rho/\rho = 0$). For the PS waves acquired with ocean bottom cables (OBC) or ocean bottom seismometers (OBS), it simply results in ($\delta\rho/\rho = 0$).

In the above imaging problem formulation, the ray-Born operator $(B_b)^*(s,x_0,r,\omega)$ and the linearized diffracted field $\delta U_b^{obs}(s,r,\omega)$ can be replaced by the ray-Born integral modelling operator, which is expressed in the form:

$$\delta U_b(s,r,\omega) = \int_{x \in V} B_{bk}(s,x,r,\omega) f_k(x) dx$$

with $f_k$ the k element of the column vector of the perturbations at ($\delta I_P/I_P$, $\delta I_S/I_S$, $\delta\rho/\rho$).

The mono-parameter hypothesis gives a generic expression for $B_{bk}$ of the form:

$$B_{bk}(s,x,r,\omega) = \text{freq}(\omega) \text{Ampl}_{bk}(s,x,r) e^{i\omega T(s,x,r)}$$

with, in 3D:

$$\text{Ampl}_{bk}^{PP}(s,x,r) = A^{PP}(s,x,r) \text{dir}_s^P (\text{pol}_r^P)_b W_k^{PP}(s,x,r)$$

$$\text{Ampl}_{bk}^{PS}(s,x,r) = \text{dir}_s^P [A^{PS}(\text{pol}_r^{S1})_b W_k^{PS1} + A^{PS}(\text{pol}_r^{S2})_b W_k^{PS2}](s,x,r)$$

$$\text{freq}(\omega) = S(\omega)\omega^2$$

$\text{dir}_s^P$ is the directivity at source s, $\text{pol}_r^P$ the polarization P at sensor r, and $(\text{pol}_r^{S1}) W_k^{S1} + (\text{pol}_r^{S2}) W_k^{S1}$ the polarization S at sensor r.

We Thus have:

$$(B_b)^*(s,x_0,r,\omega) = \text{freq}(\omega) \text{Ampl}_b(s,x_0,r) e^{i\omega T(s,x_0,r)}$$

and $$\delta U_b^{obs}(s,r,\omega) = \int_{x \in V} \text{freq}(\omega) \text{Ampl}_b(s,x,r) e^{i\omega T(s,x,r)} f(x) dx$$

so that the formulation of the imaging problem becomes:

$$I(x_0) = \sum\nolimits_{\sigma(s),\sigma(r)} \sum\nolimits_{\omega=-\omega_{max}}^{+\omega_{max}} \text{freq}(\omega)^2 Q(s,x_0,r,\omega)$$

$$\text{Ampl}_b(s,x_0,r) e^{-i\omega T(s,x_0,r)} \int_{x \in V} \text{Ampl}_b(s,x,r) e^{i\omega T(s,x,r)} f(x) dx$$

The high-frequency asymptotic hypothesis allows to make a local approximation at point $x_0$ to be imaged [Lambaré et al., 1992], it is thus possible to perform a first-order Taylor development of the total travel time $T(s,x_0,r)$ around the point considered $x_0$, i.e.:

$$T(s,x,r) = T(s,x_0,r) + (x-x_0) \cdot \nabla_{x_0} T(s,x_0,r)$$

and at zero order:

$$\text{Ampl}_b(s,x,r) \approx \text{Ampl}_b(s,x_0,r)$$

By substituting these two expressions in the imaging formula, we have:

$$I(x_0) = \sum\nolimits_{\sigma(s),\sigma(r)} \sum\nolimits_{\omega=-\omega_{max}}^{+\omega_{max}} \text{freq}(\omega)^2 \text{Ampl}_b(s,x_0,r)^2$$

$$Q(s,x_0,r,\omega) e^{-i\omega x_0 \nabla_{x_0} T(s,x_0,r)} \int_{x \in V} e^{i\omega x \nabla_{x_0} T(s,x_0,r)} f(x) dx$$

In the integral term, the change of variables can be performed:

$$p = \omega x_0 \nabla_{x_0} T(s,x_0,r)$$

This vector is also called diffraction wave number. We then have again the Fourier transform:

$$\hat{f}(p) = \int_{x \in V} e^{ix \cdot p} f(x) dx$$

of the medium perturbations, so that the imaging formula can be simply expressed as:

$$I(x_0) = \sum_{\sigma(s),\sigma(r)} \sum_{\omega=-\omega_{max}}^{+\omega_{max}} freq(\omega)^2$$
$$Ampl_b(s, x_0, r)^2 Q(s, x_0, r, \omega) e^{-i\omega x_0 \nabla_{x_0} T(s,x_0,r)} \hat{f}(p) = R(\hat{f})$$

Weight Q therefore needs to be constructed for operator R to be as close as possible to the inverse Fourier transform. It is noted that, when converting it to (2D) polar or (3D) spherical coordinates, operator R then becomes similar to an inverse generalized Radon transform. The key point consists in changing from finite discrete stacks to continuous integrals to obtain the inverse generalized Radon transform.

For continuous integration of the frequencies, we may assume that the frequency sampling is regular in the $[-\omega_{max}; +\omega_{max}]$ range, with a constant sampling interval $\Delta\omega$. Changing from a discrete finite stack to a continuous integral is not a problem. Furthermore, integration on the negative frequencies disappears by introducing coefficient 2, and we have:

$$I(x_0) = 2\sum_{\sigma(s),\sigma(r)} \int_{\omega=0}^{\omega_{max}} d\omega$$
$$\frac{freq(\omega)^2}{\Delta\omega} Ampl_b(s, x_0, r)^2 Q(s, x_0, r, \omega) e^{-i\omega x_0 \nabla_{x_0} T(s,x_0,r)} \hat{f}(p)$$

Figure 3A:
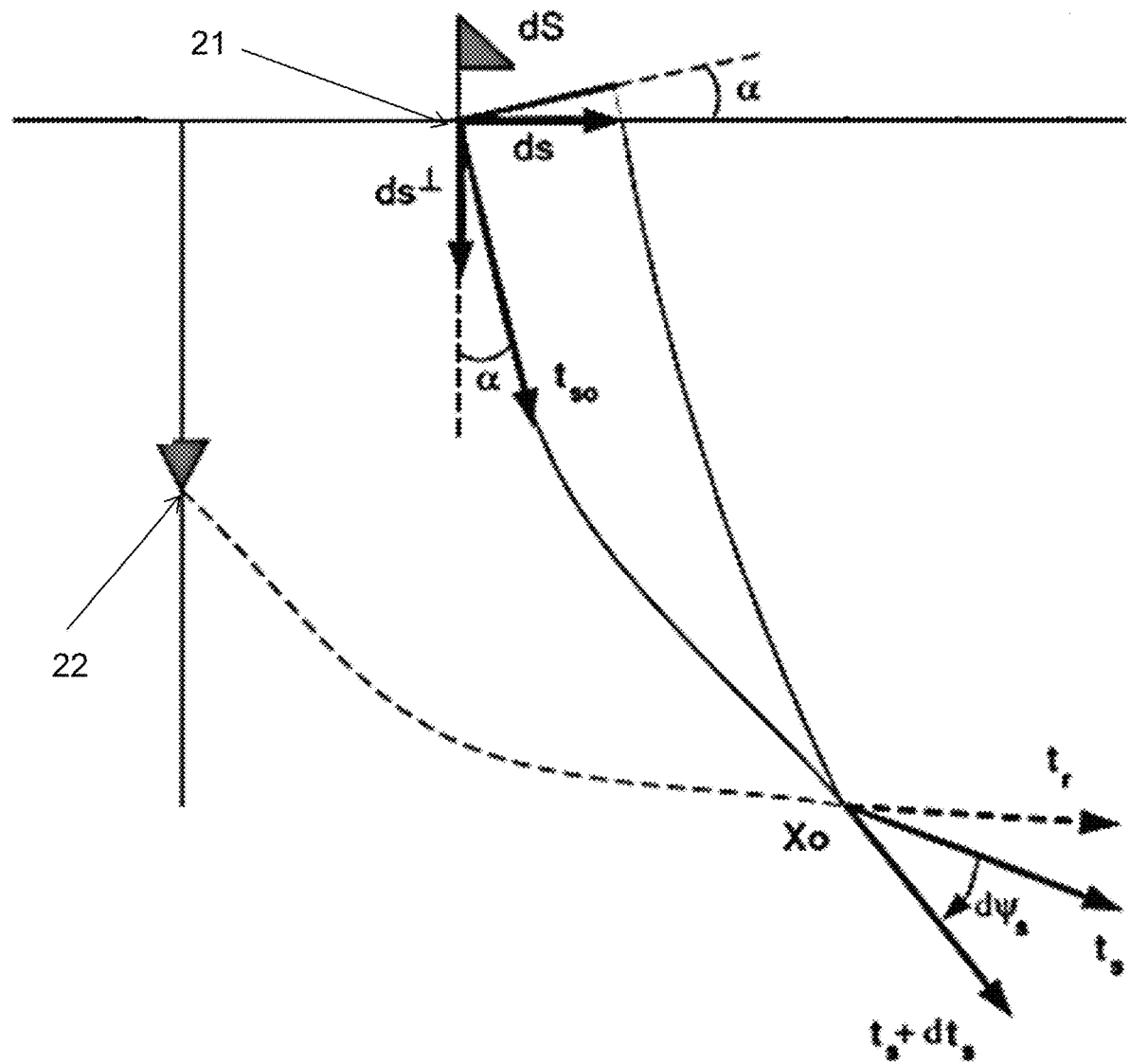
Figure 3B:
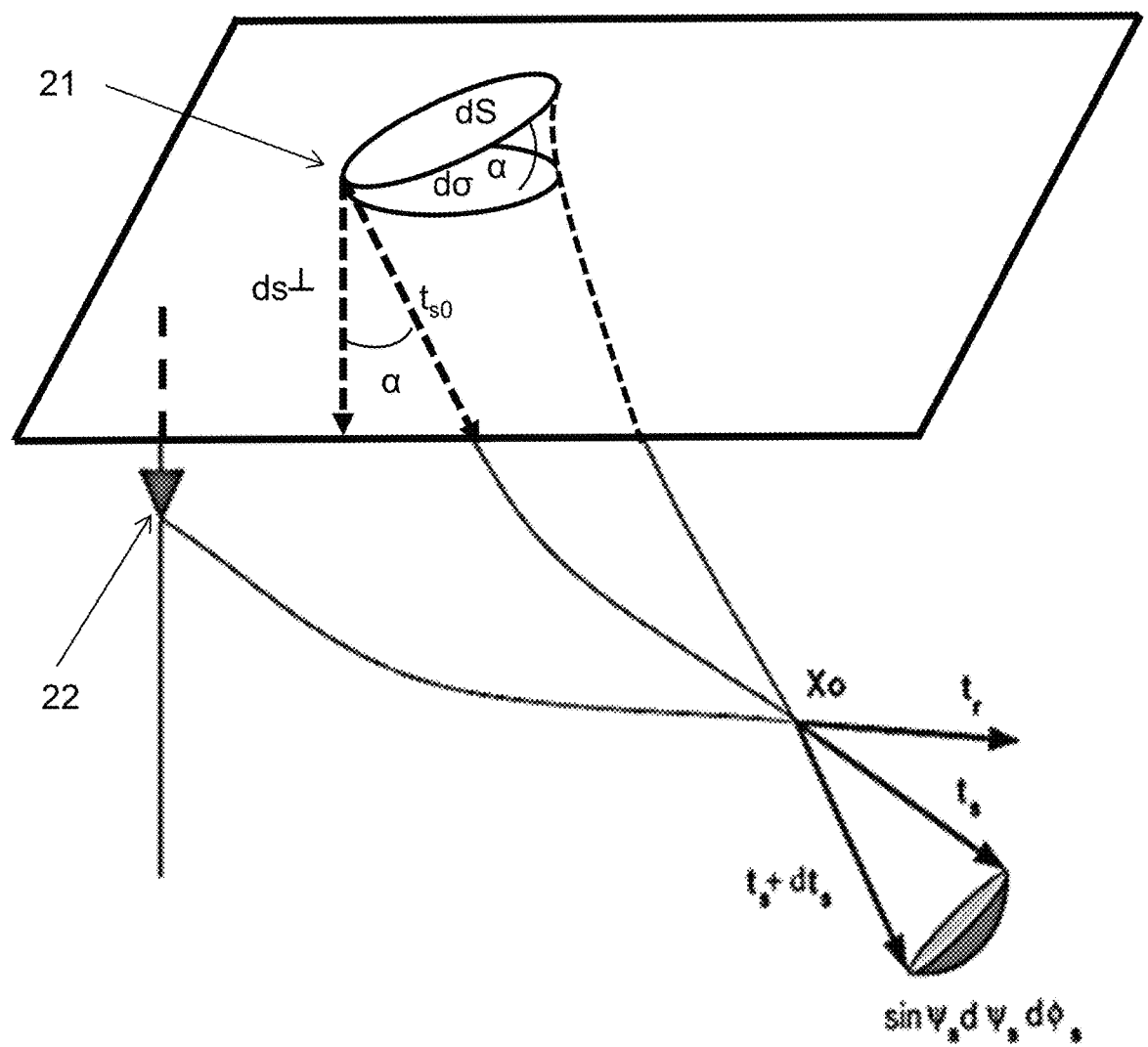

At this stage, no hypothesis has been made concerning the type of seismic acquisition. Constructing weight Q requires moving from spatial sampling (sources or sensors) to angular variations of the dip normal vector, or more simply to an investigation of the dips of the medium for each point of the zone of interest. Continuous integration of the variables associated with the acquisition device allows to construct weight Q and thus to find the expression of the inverse generalized Radon transform. This shows how important the angular coverage of acquisition device 20 is for reconstructing the geological medium [Miller et al., 1987]. FIG. 3A illustrates the angles in 2D and FIG. 3B illustrates the angles in 3D of the rays of the acoustic waves at image point xo in the case of a device consisting of a source 21 and a sensor 22. This figure also illustrates how a triangulation made from source positions can provide a solution for calculating an elementary surface Es that will be used for constructing the weight. According to one implementation of the invention, this elementary surface can be based on a triangulation constructed from the real positions of sources 21. The principle would be the same for a surface device with positions of sensors 22. It depends on the type of record collection (common source 21 or common sensor 22 recording). What is referred to hereafter as common source collection is a set of recordings performed for different (source 21, sensor 22) pairs, sensor 21 being identical for all these pairs 22. What is referred to as common sensor collection is a set of recordings performed for different (source 21, sensor 22) pairs, the sensor being identical for all these pairs 22.

If the integration variable concerns sources 21 (common sensor 22 recording), continuous integration is prepared by assigning an integration increment $\Delta s$ and using an elementary surface Es, and the above expression becomes:

$$I(x_0) = 2$$
$$\int_{E_s} ds \int_{\omega=0}^{\omega_{max}} d\omega \frac{freq(\omega)^2}{\Delta s \Delta\omega} Ampl_b(s, x_0, r)^2 Q(s, x_0, r, \omega) e^{-i\omega x_0 \nabla_{x_0} T(s,x_0,r)} \hat{f}(p)$$

It is noted that, if the integration variable concerns sensors 22 (common source recording), $E_r$ is replaced by $E_r$, $\Delta s$ by $\Delta r$ and $ds$ by $dr$ in the above expression.

In 2D, a single angle is used to describe a vector with respect to the vertical axis. Weight Q is constructed for operator R to be as close as possible to the 2D inverse Fourier transform or an inverse Radon transform in the Euclidean space $R^2$. A change of variable in polar coordinates $(s, |w|) \rightarrow (|p|, \Psi_s)$ is sufficient for this, hence:

$$Q(s, x_0, r, \omega) =$$
$$\frac{2}{(2\pi)^2 freq(\omega)^2} \frac{\Delta s \Delta\omega}{Ampl_b(s, x_0, r)^2} |\omega| |\nabla_{x_0} T(s, x_0, r)|^2 J_{s \rightarrow ts} J_{ts \rightarrow \Psi_s}$$

$$I(x_0) =$$
$$\frac{4}{(2\pi)^2} \int_{E_s} ds \int_{\omega 0}^{\omega_{max}} d\omega |\omega| |\nabla_{x_0} T(s, x_0, r)|^2 e^{-i\omega x_0 \nabla_{x_0} T(s,x_0,r)} \hat{f}(p) J_{s \rightarrow ts} J_{ts \rightarrow \Psi_s}$$

$$I(x_0) = \frac{4}{(2\pi)^2} \int_{E_{\Psi_s}} d\Psi_s \int_{|p|=0}^{p_{max}} |p| d|p| \hat{f}(p, \Psi_s) e^{-ix_0 \cdot p}$$

where J indeed represents Jacobians associated with the changes of variables [Nicoletis et al., 1997]. A 2D imaging formula (coplanar sources and sensors) is thus determined according to a preferred implementation of the invention.

It is noted that, for a common source (instead of common sensor) collection, it is enough to replace s by r, ts by tr, $\Delta s$ by $\Delta r$ and $\Psi_s$ by $\Psi_r$.

In 3D, two (Euler) angles are used to describe a vector with respect to the vertical axis. This time, weight Q is constructed for operator R to be as close as possible to the 3D inverse Fourier transform or an inverse Radon transform in the Euclidean space $R^3$. The change of variable in spherical coordinates therefore becomes $(s, |w|) \rightarrow (|p|, \Psi_s, \Phi_s)$, hence:

$$Q(s, x_0, r, \omega) = \frac{2}{(2\pi)^3 freq(\omega)^2} \frac{\Delta s \Delta\omega}{Ampl_b(s, x_0, r)^2} |p|^2 J_{\omega \rightarrow |p|} J_{s \rightarrow ts} J_{ts \rightarrow \Psi_s; \phi_s}$$

$$Q(s, x_0, r, \omega) =$$
$$\frac{2}{(2\pi)^3 freq(\omega)^2} \frac{\Delta s \Delta\omega}{Ampl_b(s, x_0, r)^2} |\omega|^2 |\nabla_{x_0} T(s, x_0, r)|^3 J_{s \rightarrow ts} J_{ts \rightarrow \Psi_s; \phi_s}$$

hence:

$$I(x_0) =$$
$$\frac{4}{(2\pi)^3} \int_{E_s} ds \int_{\omega 0}^{\omega_{max}} d\omega |\omega|^2 |\nabla_{x_0} T(s, x_0, r)|^3 e^{-i\omega x_0 \nabla_{x_0} T(s,x_0,r)} \hat{f}(p) J_{s \rightarrow ts} J_{ts \rightarrow \Psi_s; \phi_s}$$

$$I(x_0) = \frac{4}{(2\pi)^3} \int_{E_{\Phi_s}} d\Phi_s \int_{E_{\Psi_s}} \sin\Psi_s d\Psi_s \int_{|p|=0}^{p_{max}} |p|^2 d|p| \hat{f}(p, \Psi_s, \Phi_s) e^{-ix_0 \cdot p}$$

We thus determine a 3D imaging formula (non-coplanar sources 21 and sensors 22) according to a preferred implementation of the invention. Again, it is noted that, for a common source 21 (instead of common sensor 22) collection, it is enough to replace s by r, ts by tr, $\Delta$s by $\Delta$r, $\Psi_s$ by $\Psi_r$ and $\Phi_s$ by $\Phi_r$.

Relative Impedance Perturbation Models

After step (b), we have the estimated relative impedance perturbation profile, representing a pipeline 1 monitoring result, which may possibly be plotted as raw data on interface 13.

Advantageously, the method comprises a step (c) of post-processing this profile so as to obtain synthetic data therefrom, such as extraction of some parameters characteristic of the pipeline interior (thresholding, averaging, etc.) or a visual representation. For example, as described hereafter, an image of said cross-section of pipeline 1 wherein each point is assigned a colour depending on the value of the impedance perturbation at this point can be generated.

Alternatively or additionally, in step (c), said estimated relative impedance perturbation profile (i.e. the result of the quantitative migration step) is preferably compared with at least one reference model of relative impedance perturbations representative of the presence of a plug 3 in pipeline 1 at said position, or even with a plurality of reference models of relative impedance perturbations representative of a set of possible configurations of plug 3 in pipeline 1 at said position (in particular three configurations and therefore three models), so as to detect a possible plug 3 at said position.

Indeed, even when it is displayed as an image, the estimated relative impedance perturbation profile is difficult to interpret per se.

On the other hand, it is possible to construct realistic synthetic models for the plug configuration(s). In particular, in connection with FIG. 4a (illustrating an example of gas hydrate plugs in a 30-cm diameter pipeline), there are three possible plug 3 configurations in pipeline 1, with at least a total plug configuration (left, no more lumen 2), a partial plug configuration at the bottom (middle, lumen 2 only in the upper part) and a crown-shaped partial plug configuration (right, lumen in the centre). The following impedance values have been taken in the model for FIG. 4a: low value of 50 (g/cm$^3$)×(m/s) (white) for the impedance of the gas circulating in lumen 2, intermediate value of 2700 (g/cm 3)×(m/s) Pa·s/m (grey) for the impedance of plug 3, and large value of 46,400 (g/cm 3)×(m/s) Pa·s/m (black) for the impedance of the wall of pipeline 1.

From these models, relative impedance perturbations can be calculated by considering the vertical columns of the model sequentially, so as to obtain the so-called reference models of relative impedance perturbations. FIG. 4b shows the relative impedance perturbation models corresponding to the synthetic models of FIG. 4a, with a scale from −1 to +1.

The ideal reflected acoustic field is calculated by considering the contribution of each diffraction point of the model consisting of relative impedance perturbations. Considering pre-processing field data is therefore no longer needed.

Thus, quantitative migration results corresponding to the aforementioned three plug configurations are illustrated in FIG. 4c. It is noted that, when plug 3 is partial, the discontinuity between plug 3 and lumen 2 appears quite well (flat segment in the centre and circular shape to the right).

To facilitate detection of a total plug, in step (c), said estimated relative impedance perturbation profile is in addition advantageously compared with a relative impedance perturbation reference model representative of the absence of a plug 3 in pipeline 1 at said position.

Indeed, if, in connection with FIGS. 5a and 5b, two synthetic models are constructed with a pipeline containing a total hydrate plug (FIG. 5a, top left) and with only gas, i.e. absence of a plug (FIG. 5a, top right), and if their corresponding relative impedance perturbation reference models are compared (FIG. 5a, bottom), the contrast at the top of pipeline 1 is similar although stronger (about 11%) in the absence of a plug. The same trend is found when comparing the quantitative migration results (FIG. 5b), where a difference of about 12% (with a 1% uncertainty) is observed.

It is noted that this comparison can be made in many different ways. For example, for a given relative impedance perturbation profile, one may select from among the various reference models (presence of a total plug, presence of a partial plug at the bottom, presence of a partial crown-shaped plug, absence of plug) the closest by a distance function.

Plug Location and Removal

Depending on the comparison result at the end of step (c), it can be concluded that a plug 3 is present or not in pipeline 1, possibly with information descriptive of said plug 3 (shape, total or not, size, etc.).

Advantageously, the method comprises repeating steps (a) and (b), and even (c), for a plurality of positions along pipeline 1, by means of mobile acoustic acquisition device 20. In particular, the comparison of step (c) can be performed profile by profile, or profile group by profile group.

In a particularly preferred manner, a comparison of the estimated profiles is also carried out in step (c) (in particular if it is common to a profile group) for two successive positions, which allows to highlight, in case of a significant difference in relative impedance perturbations, a start and/or an end for plug 3, which reinforces the detection certainty and allows a location to be defined for plug 3.

In any case, if a plug 3 has been detected, it is possible to take action. The method thus preferably comprises, if a plug 3 has been detected in pipeline 1, a step (d) of removing the detected plug 3, notably by heating, or any other technique known to the person skilled in the art.

Equipment and Computer Program Product

According to a second aspect, an equipment 10 is provided for implementing the present method of monitoring the interior of a pipeline 1 according to any one of the variants or variant combinations described above.

This equipment 10 comprises, as explained, data processing means 11, advantageously data storage means 12 and an interface 13.

Data processing means 11 are configured:
for a position along said pipeline 1, to obtain acoustic data descriptive of a cross-section of said pipeline 1 at said position, acquired by a mobile acoustic acquisition device 20 in said water mass E,
to estimate by quantitative migration from said acoustic data an estimated relative impedance perturbation profile in said cross-section of said pipeline 1,
to advantageously compare said estimated relative impedance perturbation profile with at least one relative impedance perturbation reference model representative of the presence of a plug 3 in pipeline 1 at said position.

Preferably, the invention also relates to the assembly consisting of equipment 10 and acoustic acquisition device 20. For example, equipment 10 can be located on a boat equipped with acoustic acquisition device 20, for real-time operation.

According to a third aspect, the invention also relates to a computer program product downloadable from a communication network and/or recorded on a computer readable medium and/or processor executable, comprising program code instructions for implementing the method according to the first aspect, when said program is executed on a computer.

The invention claimed is:

1. A method of monitoring the interior of a pipeline positioned in contact with a soil below a water mass, comprising implementation by data processing means of the following steps:
   (a) for at least one position along the pipeline, obtaining acoustic data descriptive of at least one cross-section of the pipeline at the position, acquired by a mobile acoustic acquisition device in the water mass,
   (b) estimating, by quantitative migration from the acoustic data, a relative impedance perturbation profile in at least the cross-section of the pipeline, and
   (c) comparing the estimated relative impedance perturbation profile with at least one relative impedance perturbation reference model representative of presence and/or an absence of plug in the pipeline to thereby monitor the interior of a pipeline at the at least one position.

2. The method as claimed in claim 1, wherein the acoustic acquisition device comprises at least one acoustic wave source and at least one acoustic wave sensor, the acoustic data descriptive of a cross-section of the pipeline at the position being a reflected acoustic field received by the at least one sensor after generation of an acoustic field by the at least one source.

3. The method as claimed in claim 2, wherein the acoustic acquisition device comprises a plurality of sensors and/or sources positioned in a substantially orthogonal direction to a longitudinal direction of the pipeline at the position.

4. The method as claimed in claim 2, wherein the estimation by quantitative migration is obtained at a point xo of the cross-section of pipeline (1), for a collection of source(s) (21) and sensor(s) (22), if they are coplanar, with the formula:

$$I(x_0) = \frac{4}{(2\pi)^2} \int_{E_{\Psi_s}} d\Psi_s \int_{|p|=0}^{p_{max}} |p|d|p|\hat{f}(p, \Psi_s)e^{-ix_0 \cdot p}$$

and otherwise, with the formula:

$$I(x_0) = \frac{4}{(2\pi)^3} \int_{E_{\Phi_s}} d\Phi_s \int_{E_{\Psi_s}} \sin\Psi_s d\Psi_s \int_{|p|=0}^{p_{max}} |p|^2 d|p|\hat{f}(p, \Psi_s, \Phi_s)e^{-ix_0 \cdot p}$$

with Us and $\Psi_s$ the $\phi_s$ angular coverage of seismic acquisition device (20), p the diffraction wave number and f the Fourier transform of the perturbations of the medium.

5. The method as claimed in claim 1, wherein, in step (c), the estimated relative impedance perturbation profile is compared with at least one relative impedance perturbation reference model representative of the presence of a plug in pipeline at the position.

6. The method as claimed in claim 5 wherein in step (c) the estimated relative impedance perturbation profile is compared with a plurality of relative impedance perturbation reference models representative of a set of possible plug configurations in pipeline at the position.

7. The method as claimed in claim 6, wherein the set of possible plug configurations in pipeline at the position comprises at least a total plug configuration, a partial plug configuration at the bottom and a partial crown-shaped plug configuration.

8. The method as claimed in claim 5 wherein, in step (c), the estimated relative impedance perturbation profile is further compared with a relative impedance perturbation reference model representative of an absence of plug in pipeline at the position.

9. The method as claimed in claim 5, further comprising a step (d) of removal of detected plug.

10. The method as claimed in claim 1, wherein the pipeline is a hydrocarbon pipeline, the plug being a hydrate plug.

11. A computer program product downloadable from a communication network and/or recorded on a computer readable medium and/or processor executable, comprising program code instructions for implementing the method as claimed in claim 1, when the program is executed on a computer.

12. The method as claimed in claim 1 wherein, in step (c), the estimated relative impedance perturbation profile is compared with a relative impedance perturbation reference model representative of an absence of plug in pipeline at the position.

13. A method of monitoring the interior of a pipeline positioned in contact with a soil below a water mass, comprising implementation by data processing means of the following steps:
   (a) for at least one position along the pipeline, obtaining acoustic data descriptive of at least one cross-section of the pipeline at the position, acquired by a mobile acoustic acquisition device in the water mass, wherein the acoustic acquisition device comprises at least one acoustic wave source and at least one acoustic wave sensor, the acoustic data descriptive of a cross-section of the pipeline at the position being a reflected acoustic field received by the at least one sensor after generation of an acoustic field by the at least one source,
   (b) calculating, at the positions of each source and each sensor, Green's functions representative of a response to a specific acoustic emission at any point of the cross-section, then estimating at any point of the cross-section of the pipeline a relative impedance perturbation value according to the acoustic field received and to parameters of the calculated Green's functions, and
   (c) comparing the estimated relative impedance perturbation value with at least one relative impedance perturbation reference model representative of presence and/or an absence of plug in the pipeline to thereby monitor the interior of a pipeline at the at least one position.

14. The method as claimed in claim 13, wherein calculation at the positions of each source and each sensor of the Green's functions comprises interpolation according to the real positions of the sources and the sensors of Green's functions pre-calculated for a set of fictitious positions.

15. An equipment for monitoring the interior of a pipeline positioned in contact with a soil below a water mass, the equipment comprising data processing means configured:
   for at least one position along the pipeline, to obtain acoustic data descriptive of at least one cross-section of the pipeline at the position, acquired by a mobile acoustic acquisition device in the water mass, to estimate by quantitative migration from the acoustic data an estimated relative impedance perturbation profile in at least the cross-section of the pipeline.

\* \* \* \* \*